United States Patent
Thomire

[19]

[11] Patent Number: 5,810,145
[45] Date of Patent: Sep. 22, 1998

[54] HYDRAULICALLY CONTROLLED DISENGAGEMENT DEVICE FOR A CLUTCH, NOTABLY FOR MOTOR VEHICLES

[75] Inventor: Sylvain Thomire, Levallois, France

[73] Assignee: Valeo, Paris, France

[21] Appl. No.: 713,766

[22] Filed: Sep. 13, 1996

[30] Foreign Application Priority Data

Sep. 14, 1995 [FR] France .................................. 95 11012

[51] Int. Cl.⁶ .................................................. F16D 25/08
[52] U.S. Cl. .................................. 192/85 CA; 192/91 A; 192/98; 192/115; 92/128; 92/161; 403/349
[58] Field of Search ............................ 192/85 CA, 91 A, 192/98, 115, DIG. 1; 92/128, 161; 403/349

[56] References Cited

U.S. PATENT DOCUMENTS

| 4,344,516 | 8/1982 | Kolb ................................. 192/85 CA |
| 4,620,625 | 11/1986 | Ladin ............................... 192/85 CA |
| 4,779,515 | 10/1988 | Staub, Jr. ............................ 92/128 |
| 4,798,129 | 1/1989 | Staub, Jr. .......................... 92/161 X |
| 4,905,576 | 3/1990 | Reynolds . |
| 4,979,602 | 12/1990 | Fukushima ..................... 192/85 CA |
| 5,056,412 | 10/1991 | Gautier et al. ..................... 92/161 X |
| 5,398,796 | 3/1995 | Doremus ......................... 192/85 CA |
| 5,577,585 | 11/1996 | Corral .............................. 192/91 A |

FOREIGN PATENT DOCUMENTS

| 3504086 | 8/1986 | Germany . |
| 8815881 | 2/1989 | Germany . |
| 4412734 | 3/1995 | Germany . |

*Primary Examiner*—Richard M. Lorence
*Attorney, Agent, or Firm*—Longacre & White

[57] ABSTRACT

A disengagement device includes a clutch release bearing, provided with a fixed part (2, 4) comprising an outer body (2) and an inner support tube (4) defining an axially oriented blind annular cavity (40) able to be fed with fluid and inside which a piston (3) is mounted so as to be axially mobile, a sole plate is able to be fixed to a fixed part and mounting means of the bayonet type (6) act between the said sole plate (5) and the outer body (2) of the clutch release bearing (1) for bayonet-type mounting of the clutch release bearing (1) on the sole plate (5) previously fixed to the said fixed part (7).

15 Claims, 11 Drawing Sheets

HYDRAULICALLY CONTROLLED DISENGAGEMENT DEVICE FOR A CLUTCH, NOTABLY FOR MOTOR VEHICLES

FIELD OF THE INVENTION

The present invention concerns hydraulically controlled disengagement devices of the concentric type for clutches, notably for motor vehicles, and more particularly a hydraulically controlled disengagement device of the concentric type having a unitary assembly, known as a clutch release bearing, provided with a fixed part comprising an outer body and a concentric inner support tube fixed to the outer body and defining an axially orientated blind annular cavity able to be fed with fluid and inside which is mounted, so as to be axially mobile, a piston projecting axially with respect to the free end of the outer body and carrying at its free end a driving element suitable for acting on the disengagement device of the clutch such as a diaphragm.

BACKGROUND OF THE INVENTION

This hydraulic bearing can be fed with a fluid of the gaseous or liquid type and this is the reason why it is usually referred to as a hydraulically controlled clutch release bearing.

This bearing is of the concentric type since it is adapted to have a shaft pass through it, such as the input shaft of the gearbox in the case of an application to a motor vehicle.

By means of its outer body, this hydraulic bearing is adapted to be fixed to a fixed part, namely the clutch casing in the case of an automobile application.

To do this, the rear end of the outer body usually has lugs for fixing it to the fixed part by means of fixing devices, such as screws passing for this purpose through a hole formed in each lug.

A standardisation problem is posed. This is because in some cases fixing is effected by means of two lugs and in other cases by means of three lugs.

In addition the outer body is shaped according to the application and notably as a function of the fixed part to which the body is attached. All this militates against standardisation.

DISCUSSION OF THE INVENTION

The object of the present is to mitigate this drawback in a simple and economical manner and therefore to standardise the hydraulically controlled disengagement device of the concentric type.

According to the invention, there is provided a hydraulically controlled disengagement device of the concentric device for a clutch, notably for motor vehicles, having a unitary assembly, referred to as a clutch release bearing, provided with a fixed part comprising an outer body and a concentric inner support tube fixed to the outer body and defining an axially oriented blind annular cavity suitable for being fed with fluid and inside which is mounted so as to be axially mobile a piston projecting axially with respect to the free end of the outer body and carrying, at its free end, a driving element able to act on the disengagement device of the clutch, such as a diaphragm, including a sole plate forming an adaptor for fixing it to a fixed part such as a casing, and mounting means of the bayonet type acting between the said sole plate and the outer body of the clutch release bearing for bayonet-type mounting of the clutch release bearing on the sole plate previously fixed to the said fixed part.

By virtue of the invention it is possible to standardise the clutch release bearing for all applications and its fixing to the clutch casing is performed rapidly on the said sole plate without any tool.

As will have been understood, the sole plate, advantageously made of sheet metal, is specific to each application, its shape depends on the fixed part and notably on the protrusions on the said fixed part. It is distinct from the clutch release bearing.

Thus this sole plate serves as an adaptor and can be provided with two, three or more lugs according to the application. The axial thickness of the sole plate also depends on the application.

Thus, the sole plate being previously centred and fixed on the fixed part, the clutch release bearing proper is offered up opposite the sole plate and then a rotation is performed.

To do this the sole plate has, in one embodiment, tabs for fixing the clutch release bearing forming a unitary assembly or module.

Correspondingly the outer body has recesses enabling the tabs on the sole plate to pass.

By performing a rotation of the clutch release bearing proper, the tabs on the sole plate engage on ramps provided on the outer body, thus ensuring clamping.

Advantageously the bayonet-type mounting means also include means for locking with respect to rotation.

The locking means can consist of a specific tab on the sole plate designed to engage in a complementary hollow formed in the outer body.

For example the sole plate has three fixing tabs to ensure clamping and fixing of the clutch release bearing proper and a more flexible rotational-locking tab for serving as means of locking with respect to rotation.

Advantageously the tab for locking with respect to rotation also serves as a locating device and for positioning the clutch release bearing.

The outer body therefore has four recesses for the aforementioned tabs to pass. After a rotation of approximately 20° the tab for locking with respect to rotation, advantageously thinner and more flexible, falls into the complementary hollow formed on the outer body.

The system is therefore demountable by means of a screwdriver for raising the tab for locking with respect to rotation.

Advantageously the inner support tube is distinct from the outer body.

This tube, advantageously made of metal, is fixed to the body for example by crimping by means of three sectors formed on the body.

In this way the hydraulically controlled clutch release bearing is obtained which is simple and easy to manufacture.

The piston is therefore advantageously tubular in shape and carries at its free end the driving element in the form of a ball bearing whose outer ring is suitable for acting on the disengagement device of a clutch, such as a diaphragm, whilst its inner ring extends at least for a major part in axial projection towards the outer body, that is to say in the direction opposite to the free end of the piston.

This inner ring is advantageously made of sheet metal and extends radially above the free end of the outer body.

Thus it is possible to reduce the axial dimension of the clutch release bearing and use the inner ring to attach a protective bellows.

For example, the inner ring has a radial edge directed inwards in order to bear on a flange carried by the piston.

This radial edge is subject to the action of an elastic washer engaged in a groove formed in the free end of the piston, more precisely in a tubular nose which the latter has at its free end.

The inner radial edge surrounds the said nose with clearance, so that the bearing can move radially under the control of the elastic washer, such as a Belleville washer in the shape of a dihedron with inclined inner tabs engaged in the aforementioned groove.

The other end of the inner ring has a radial edge directed outwards. It is to this radial edge that the bellows is attached. The other end of the bellows has an enlargement interposed between a shoulder on the outer body and a support piece for a return spring, the other end of which bears on the piston via for example a dish.

This spring makes it possible, in a manner known per se, to apply a preliminary load to the disengagement device of the clutch such as a diaphragm.

By virtue of all these arrangements, it is possible to grip the tube between the outer body and a flat support area for the sole plate offset axially in order to serve as an adaptor according to the application. In this way a simple and economical solution is obtained.

BRIEF DESCRIPTION OF THE DRAWINGS

The following description illustrates the invention with regard to the accompanying drawings in which.

DESCRIPTION OF THE PREFERRED EMBODIMENT

These figures illustrate the hydraulically controlled disengagement device of the concentric type for an automobile clutch.

This device includes a unitary assembly 1, known as a hydraulically controlled clutch release bearing of the concentric type and, according to the invention, a sole plate 5 suitable for being fixed with centring on a fixed part, in this case the clutch casing 7 of the vehicle.

The clutch release bearing 1 is said to be of the concentric type since it is able here to have pass through it the input shaft 8 of the gearbox. This bearing 1 has an outer body 2 and an inner tube 4 forming a fixed part. The tube 4, in this case made of metal and thin, and the outer body 2 made of castable material, in this case aluminium, or as a variant from plastic, are mounted concentrically, the shaft 8 passing inside the tube 4. This tube 4 is longer axially than the body 2 and therefore projects axially with respect to the latter. The tube 4 and body 2 define an axially oriented blind annular cavity 40 suitable for being fed with fluid and inside which there is mounted so as to be axially movable a piston 3 projecting axially with respect to the free or front end of the outer body 2, here tubular in shape overall like the tube 4. The piston 3 carries at its free end a driving element 38 able to act on the disengagement device of a clutch, here a diaphragm 7. The piston 3 belongs to the movable part which the clutch release bearing 1 includes.

Figures 2, 16:
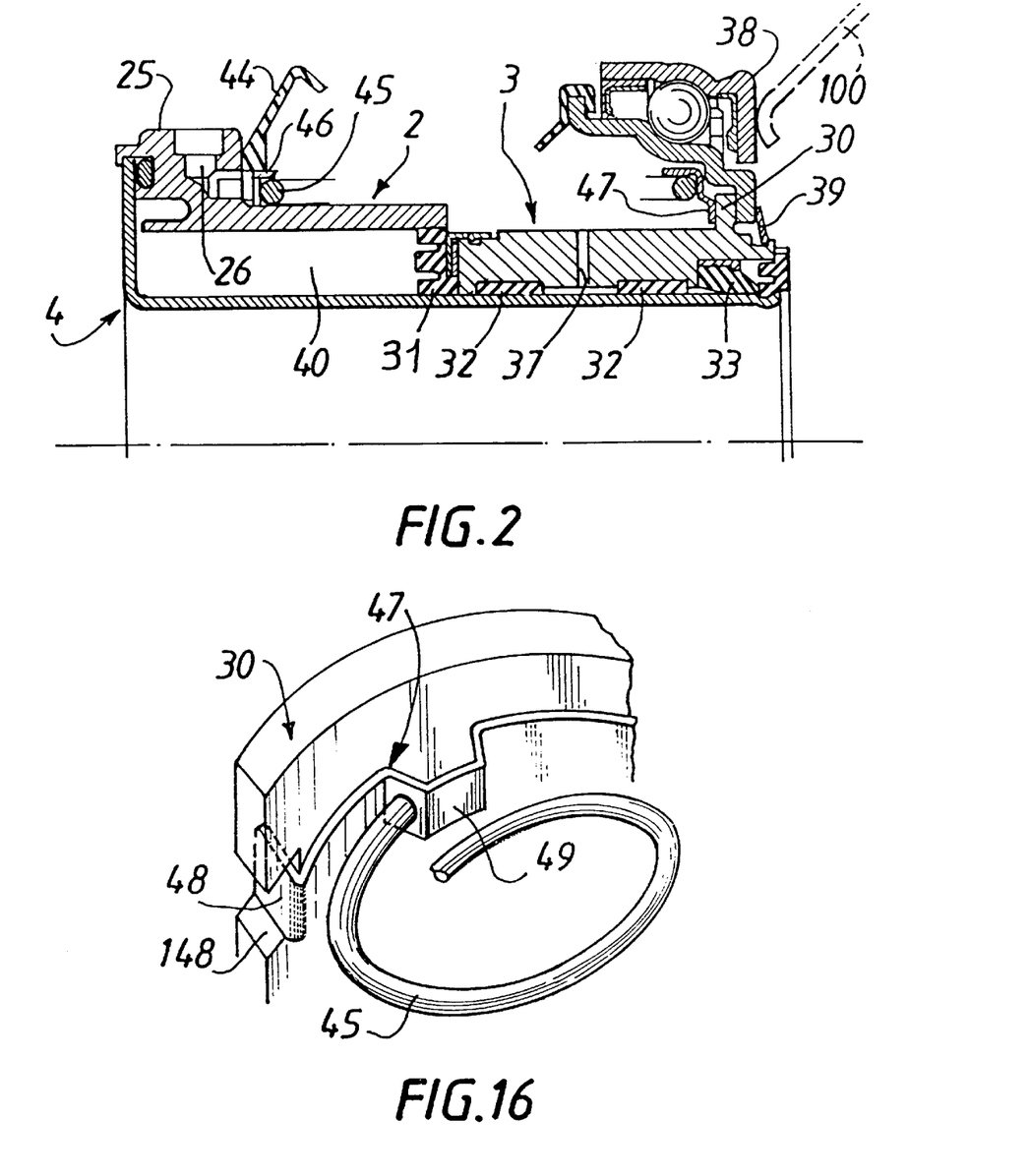
FIG. 2 is a half view in axial section of the bearing in FIG. 1 through another plane.
FIG. 16 is a perspective view showing the support dish for the pre-loading spring with which the clutch release bearing is provided.

FIG. 2 depicts at 100 the ends of the fingers of such a diaphragm. The body 2 and tube 4 can be made in a single piece. In the figures illustrated, the tube 4 is distinct from the body 2. This arrangement facilitates the manufacture of the body 2, reduces the cost of manufacturing the clutch release bearing 1, facilitates the assembly of the bearing and reduces the radial dimension since the tube 4 can be thin.

More precisely the body 2 has at its rear end a collar 23 projecting radially outwards. A main connecting piece 20 is integral with this collar 23 by being made in one piece with it. This connecting piece 20 has feed 21 and drainage 22 channels opening out in the blind cavity, the piston 3 delimiting, by means of this cavity 40 (with this cavity 40), a variable-volume hydraulic control chamber fed by the channel 21.

The control fluid can be gaseous or hydraulic in nature and this is the reason why such a bearing is usually referred to as a hydraulically controlled clutch release bearing. Here the control fluid is a hydraulic liquid, in this case oil.

The collar 23 is also provided with a secondary connecting piece 25 for discharging liquid, such as oil. The connecting piece 25 is provided with a channel 26 for recovering liquid leakages, as described hereinafter.

It will be noted that the connecting piece 20 is inclined axially in order to reduce the axial dimension of the clutch release bearing, having regard to the configuration of the clutch casing 7. The connecting piece 20 projects radially. The connecting piece 20 is easy to grip.

Conduits, not marked, are connected to the connecting piece 20 and the secondary connecting piece 25.

As is known, the bearing 1 forms a receiver dependent on a master cylinder controlled for example by a clutch pedal.

The control chamber can therefore be pressurised or depressurised. When the chamber is depressurised, the piston occupies a retracted position (top part of FIG. 1), under the action of the diaphragm 100, the clutch is then engaged.

Figure 1:
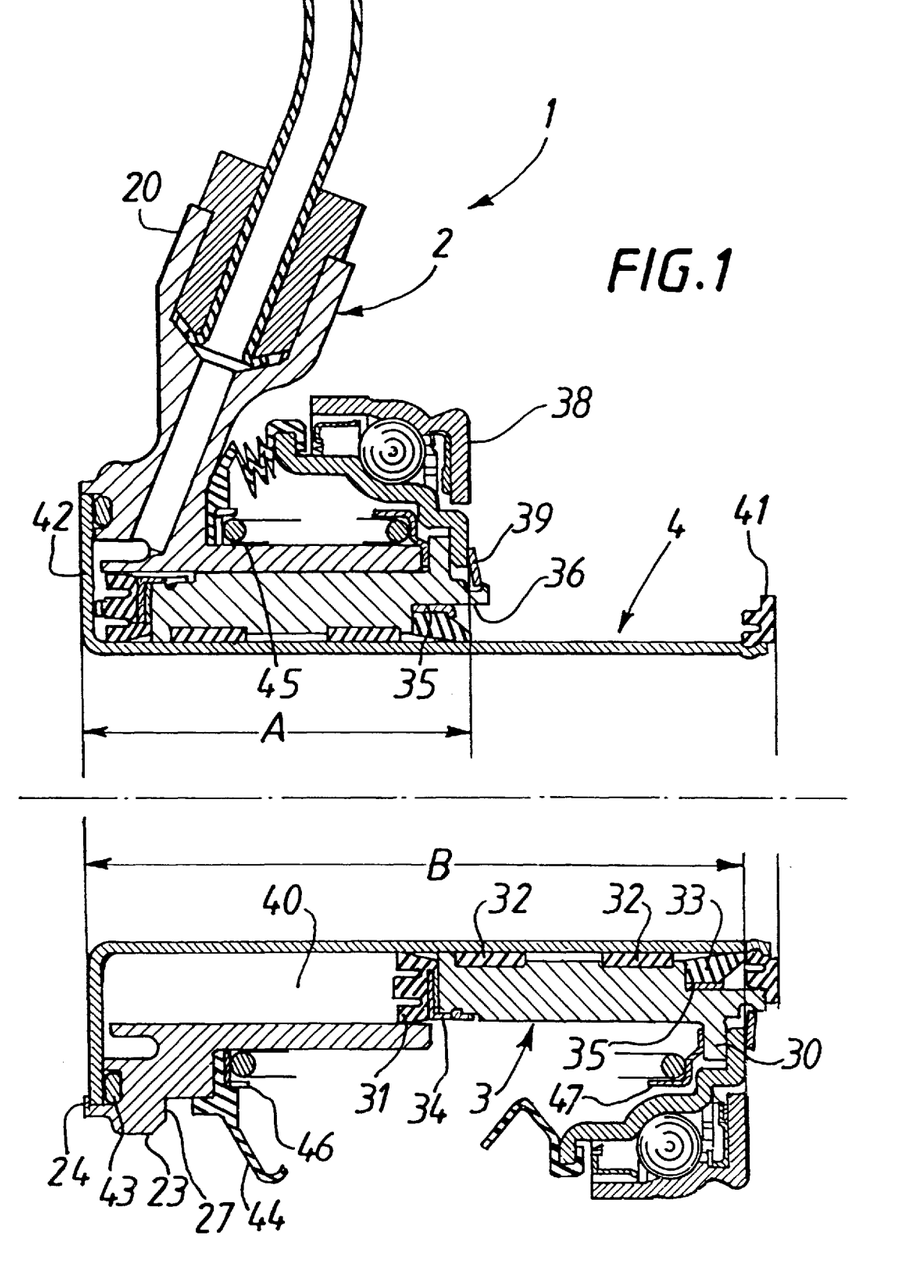
FIG. 1 is a view in axial section of a hydraulically controlled clutch release bearing of the concentric device suitable for being attached to a sole plate according to the invention.

It will then be noted that the functional length of the bearing 1 has the value A.

When the chamber 40 is pressurised, the piston 3 then occupies an advanced position (bottom part of FIG. 1) and acts on the diagram 100 by causing the latter to tilt, in a manner known per se, so that the clutch is then disengaged. The functional dimension of the bearing is then B.

When the chamber 40 is depressurised, the piston 3 returns to its retracted position under the action of the diaphragm.

Thus the axial travel of the clutch release bearing has overall the value B–A.

It will be noted that the clutch release bearing is provided with a spring 45, here of the coil spring type, known as a preliminary loading spring, since it enables a constant load to be exerted on the diaphragm, so that contact is always taking place between the driving element 38 carried by the piston 3 and the diaphragm 100.

More precisely the tube 4 has at its rear end a transversely oriented edge 42 directed radially outwards. This edge 42 cooperates with the back face of the collar 23, notched for this purpose.

Thus the outer periphery of the edge 42 centres the outer body 2, and a joint 43, mounted in a groove in the collar 23, is interposed axially between the rear face of the collar 23 and the outer periphery of the flange 42 in order to make the blind cavity 40 fluidtight.

Here the rear face of the collar 23 is provided with three crimping sectors 24. Thus the tube 4 is fixed to the body 2 by crimping and it will be appreciated that machining of the body 2 is greatly facilitated because the latter is distinct from the tube 4. As a variant the edge 42 can be fixed to the collar 23 by screwing or any other means.

At its front end the tube 4 carries a stop 41, for example made of plastic. This stop is fixed to the free end of the tube 4, for example by snapping on, the said stop 41 having at its inner periphery elastically deformable and notched tabs suitable for mounting by snapping-in in a groove, not marked, formed at the free end of the tube 4.

Thus, during mounting, the catches on the tabs on the stop 41 enter the groove in the tube 4. This stop makes it possible to limit the axial travel of the piston 3. It therefore permits the formation of a unitary assembly, known as a clutch release bearing, which can be manipulated and transported by virtue of the pre-loading spring 45 bearing, in a manner described below, on the front face of the collar 23 and on the rear face of a radial flange 30 directed radially in the direction opposite to the axis of the assembly, which the piston 3 has at its free end.

Thus this preliminary loading spring 45 acts on the edge 42 in contact with the rear face of the collar 23 with crushing of the joint 43 and the piston 3 in contact with the stop 41. Thus, normally, the crimping sectors are unnecessary.

Nevertheless, the latter have been produced since this makes it possible to pre-fill the liquid cavity 43 with hydraulic fluid, in this case oil, so that, even if the pressure in the cavity 40 is greater than the load exerted by the pre-loading spring 45, a unitary assembly is always obtained.

Naturally it is possible to pre-fill the clutch release bearing 1 after mounting it on the casing 7 in the manner described below, so that the crimping sectors 24 are not necessary.

The piston 3 here has a tubular shape and is therefore economical to manufacture. It carries two split rings 42 each mounted in a groove, not marked, in the piston 3 for the said piston to slide along the tube 4 when passing from its retracted position to its advanced position and vice versa.

The rear end of the piston carries a sealing joint 31 mounted in the cavity 40. This joint 31 has lips respectively for contact with the outer periphery of the tube 4, along which the piston 3 slides, and for contact with the inner periphery of the body 2.

Centrally this joint 31 has a stud able to come into contact with the flange 42 in order to limit noise. A metal fixing piece 34 is embedded transversely in the joint 31. This piece has at its outer periphery notched, axially oriented tabs, the catches on which are able to engage in an associated groove, not marked, formed at the rear end of the piston 3 and which is trimmed at this point so that the tabs on the piece 34 do not interfere with the sliding of the piston 3. The stop 41 prevents the joint 31 escaping from the cavity 40.

At its front end the piston 3 has a scraper joint 33 mounted in a housing 36 produced in the piston 3 by means of a piece 35. This piece 35, here made of metal, enables the joint 33 to be mounted in the piston 3 by hooping.

It will be noted that the housing 36, open towards the front end of the piston 3, is produced by a change in diameter of the internal bore of the piston 3, and that the stop 41 conceals the scraper joint 33, when the clutch release bearing is in the advanced position (FIG. 1).

This stop 41 forms a baffle and protects the joint 33, which prevents the cavity 40 being contaminated by impurities and prevents the control oil from emerging outside the bearing and contaminating the friction linings forming part of the clutch.

By virtue of the scraper joint 33 it is possible to collect any oil leakages and for this purpose the piston 3 is provided with a transverse drilling 37.

Thus any oil leakages present between the inner periphery of the piston 3 and the outer periphery of the tube 4 pass through the rings 32 split for this purpose and are sent by the channel 37 into a sealed housing delimited by sealing bellows 44, the front face of the collar 3 and the ball-bearing 3 constituting the aforementioned driving element 38.

These leakages pass after the T-shaped channel 26 so as to arrive at the connecting piece 25 and the conduit for discharging oil leaks.

The enlargement 44 also protects the cavity 40 and prevents impurities or the like from entering this cavity.

More precisely, the ball-bearing 38 forms the driving element of the clutch release bearing able to cooperate with the fingers 100 of the diaphragm.

Here this bearing has an inner ring made of sheet metal and an outer ring also made of sheet metal, or as a variant solid, able to cooperate with the fingers 100 of the diaphragm.

Here the outer ring has a plane face for cooperating with the said fingers 100 with a convex end.

Naturally this depends on the application and notably on the shape of the fingers 100 of the diaphragm, which in some cases are flat, so that in this case the outer ring of the bearing 38 is convex in order to bear on the fingers 100. In all cases a contact at one point is obtained.

The inner ring of this bearing 38 has, at one of its axial ends, an outer radial edge directed radially in the direction opposite to the axis of the assembly, and at its other end an inner radial edge directed radially towards the axis of the assembly.

This inner radial edge is designed to come into contact with the front face of the transverse flange 30 on the piston 3 whilst being pressed against it under the action of an axially acting elastic washer 39 mounted in a groove, not marked, which the piston 3 has at its free end (or front end).

Here the groove is formed in a tubular nose, which the piston 3 has at its front end. The clutch release bearing is thus of the self-centring type with self-centring maintained by the washer 39 (here of the Belleville washer type) rated accordingly; a radial clearance existing between the said inner edge and the said nose.

The outer edge of the inner ring of the bearing 38 allows the attachment of the bellows 44 shaped for this purpose so as to have a groove engaged on the outer edge. At its other end the bellows 44 has an enlargement. The return spring 45 bears on the said enlargement on the bellows 44, by means of a metal bearing piece 46. The enlargement is therefore gripped between the said piece 46 and the front or forward face of the collar 23. The piece 46 and the said enlargement on the bellows 44 have a drilling at the level of the channel 26 so as to allow circulation of oil leakages.

It will be noted that the end of the spring 45 has one end engaged with radial clearance in the axial part of the channel 26, so that the spring 45 is locked in rotation with respect to the body 2 and so that leakages, here oil, can pass through the channel 26.

At its other end the return spring 45 bears on the rear face of the flange 30 through a support dish 47. This dish 47 has a twisted shape and has tabs 48 each engaged axially in an associated notch 148 produced at the outer periphery of the flange 30.

The dish 47, here made of metal, is therefore locked in rotation with respect to the piston 3. This piece 47 has a part 49, in the form of a bridge, with a hole for engaging the end of the spring 45, which is thus locked in rotation.

It will be noted that the bridge 49 extends whilst projecting axially in the direction of the body 2, as can be seen in FIG. 16, in which only a single tab 48 and a single notch 148 has been depicted.

Naturally the pieces 47 and 46 have an axially oriented edge in order to correctly hold the ends of the turns of the spring 45.

As will have been understood and as appears clearly from the description, the clutch release bearing 1 is compact axially since the bearing 38 extends so as to be recessed with respect to the free end of the piston. More precisely this bearing 38 extends projecting axially in the direction of the body 42 with respect to the free end of the piston 3, and the inner ring of this bearing is shaped so as to extend radially above the body 2, of tubular shape at this point.

Thus the spring 45, in contact with the outer periphery of the body 2, extends radially inside the outer ring of the bearing 38 delimiting, with the bellows 44 and body 2, a sealed housing as mentioned above.

According to one characteristic of the invention, the hydraulically controlled disengagement device of the concentric type for a clutch has a sole plate 5 suitable for being fixed to a fixed part, here the clutch casing 7.

According to another characteristic, mounting means of the bayonet type 6 act between this sole plate 5 and the outer body 2 of the clutch release bearing 1 for bayonet-type mounting of the clutch release bearing proper on the sole plate 5 previously fixed to the fixed part 7. This sole plate 5 is here made of pressed sheet metal. It is therefore obtained simply and economically. It serves as an adaptor piece as a function of the shape of the fixed part here of the clutch casing, which varies from one vehicle to another, as can be seen for example in FIGS. 5 and 14.

As a variant the sole plate 5 can be made of castable material.

Thus, by virtue of the invention, it is possible to standardise the clutch release bearing for all applications, and the fixing of the said bearing 1, forming a unitary assembly or module, is performed rapidly for the said sole plate without any tool.

Figure 15:
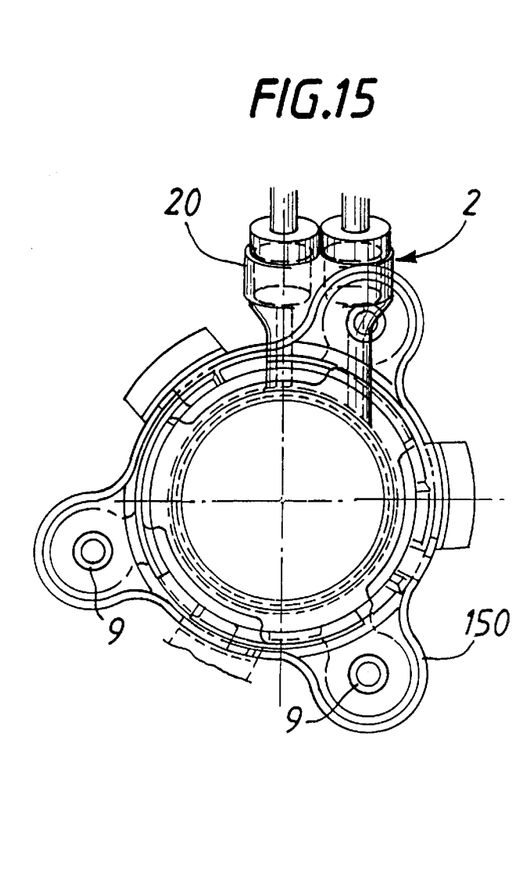
FIG. 15 is a view in the direction of the arrow 15 in FIG. 14.

The sole plate 5 is specific to each application. Thus the sole plate has two (FIG. 8) or three lugs (FIG. 15) for fixing it to the casing 7 by means of fixing devices, usually screws 9, which screw into threaded holes formed in the casing 7. As a variant the fixing is achieved by riveting, bolting or any other means. For this purpose each lug respectively 50, 150 has a hole 51 for passage of the fixing devices 9.

Figure 10:
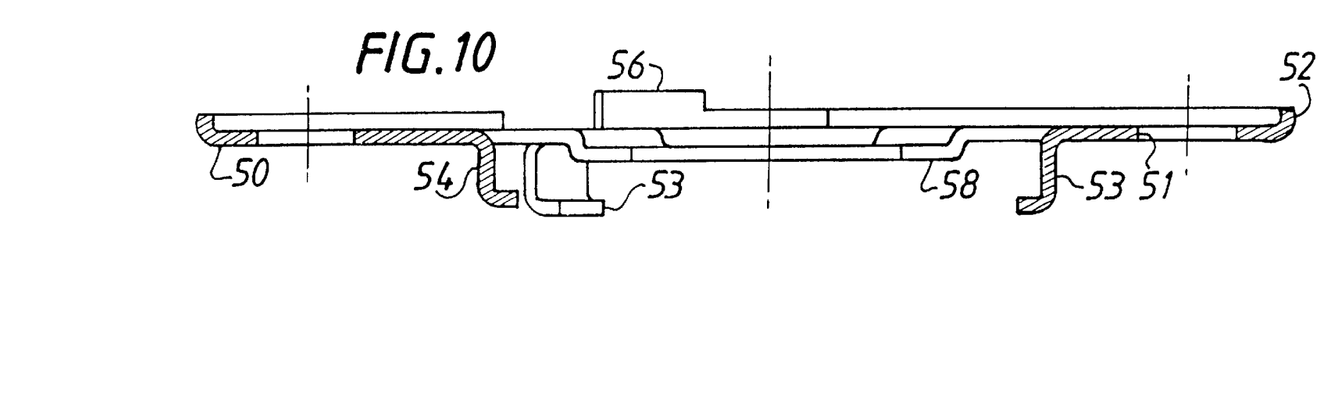
FIG. 10 is a view in cross section of the sole plate along the line 10—10 in FIG. 9.

The sole plates have centring means 56 (FIG. 10) and 152 (FIG. 14) for centring them with respect to the casing 7, the shape of which varies according to the application.

In practice this casing 7 has protrusions, so that the centring means 56, 152 are adapted to cooperate with the inner or outer periphery of these protrusions, as described below.

Thus the sole plate is centred and fixed to the casing 7 in advance before bayonet-type mounting of the clutch release bearing 1 forming a unitary assembly of a standard type for all applications.

More precisely, the bayonet-type mounting means have recesses 64 to 67, here in the form of notches open radially towards the outside, formed at the outer periphery of the collar 23 on the outer body 2. These recesses 64 to 67 delimit circumferential fixing sectors 61 to 63.

Correspondingly each sole plate 5 has fixing tabs 53 regularly distributed circumferentially.

The tabs 53 are able to engage behind the body 2, each in a recess 64 to 67, to pass axially through the said recesses, and then by rotation to come into engagement with the circumferential fixing sectors 61 to 63, and more precisely with the plane front face 27 of the said sectors.

More precisely, the fixing tabs 53 are in the form of an angle bracket. They therefore extend axially projecting from the front or forward face of the sole plate in order to present a free end folded radially inwards.

This free end, of radial orientation, is able to cooperate with the plane front face 27 of the fixing sectors 61 to 63 and therefore to come into engagement with them.

Naturally the height of the recesses 64 to 67 is such that the tabs 53 can pass axially through the said recesses.

More precisely, each recess 64 to 67 is delimited laterally by an entry bevel 60 belonging to a fixing sector 61 to 67 and forming in some way a ramp for the fixing tabs 53. The sectors 64 to 67 thus have a bevel 60 at one of their circumferential ends.

Figure 6:
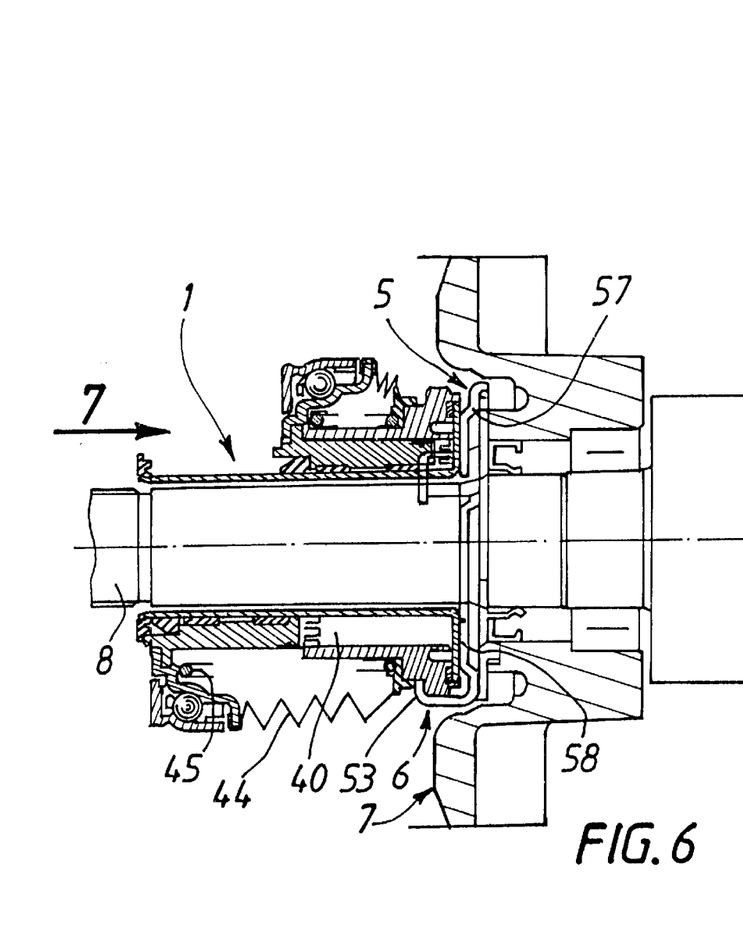
FIG. 6 is a view showing the clutch release bearing according to FIG. 1 mounted on the sole plate of FIG. 5.

Thus, when the tabs 53 are rotated, they are clamped in contact with the plane front face 27 of the sectors 61 to 63, as can be seen for example in FIG. 6.

At the same time, the edge 41 of the edge 4 is clamped between the sole plate 50 and the back or rear face of the collar 23, so that, after mounting, the guide tube 4 is fixed by clamping to the casing 7 and body 2.

Figures 11, 12:
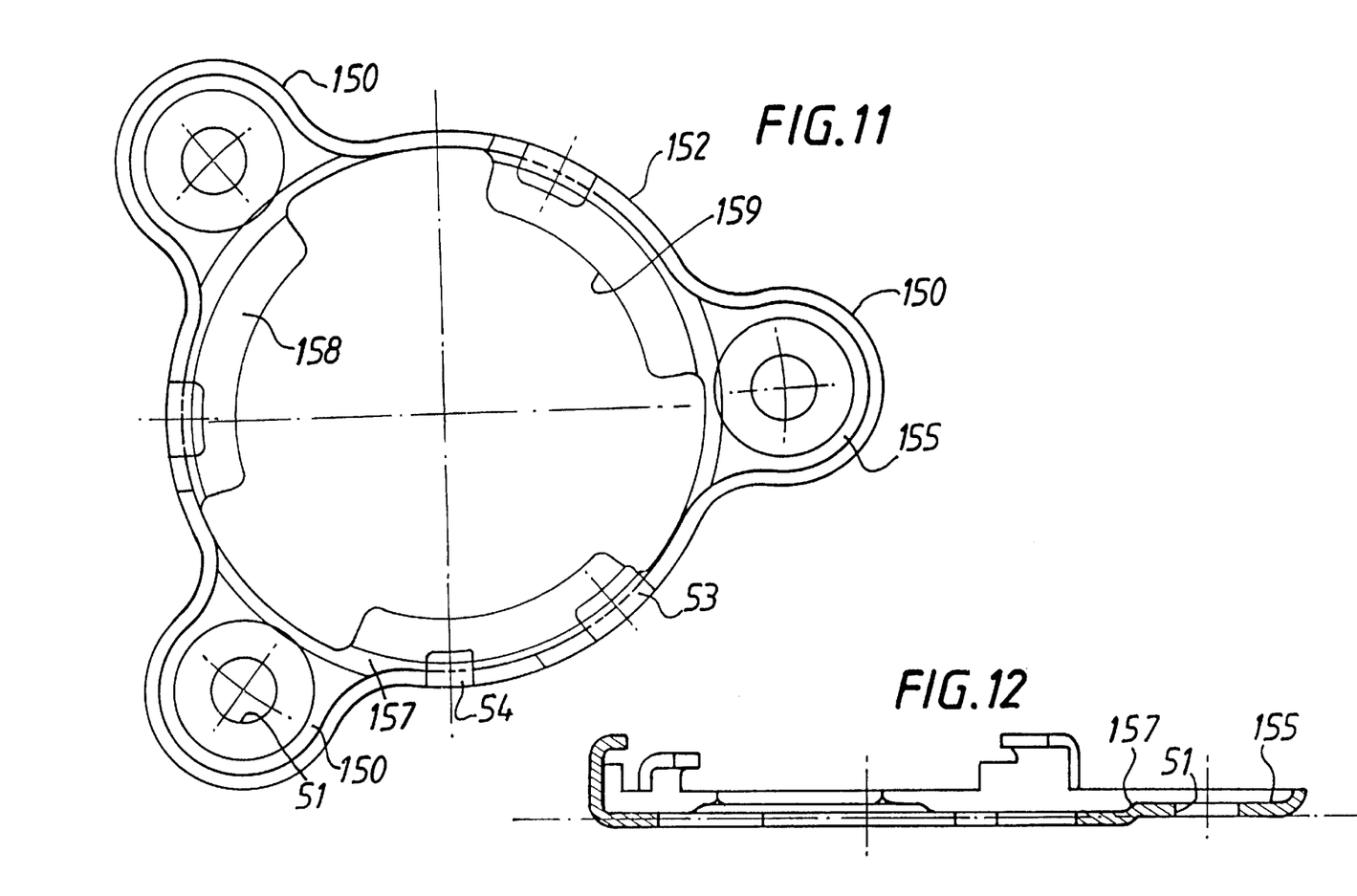
FIG. 11 is a view of the front face of the sole plate for a second example embodiment.
FIG. 12 is a view in cross section along the line 12—12 in FIG. 11.
Figure 13:
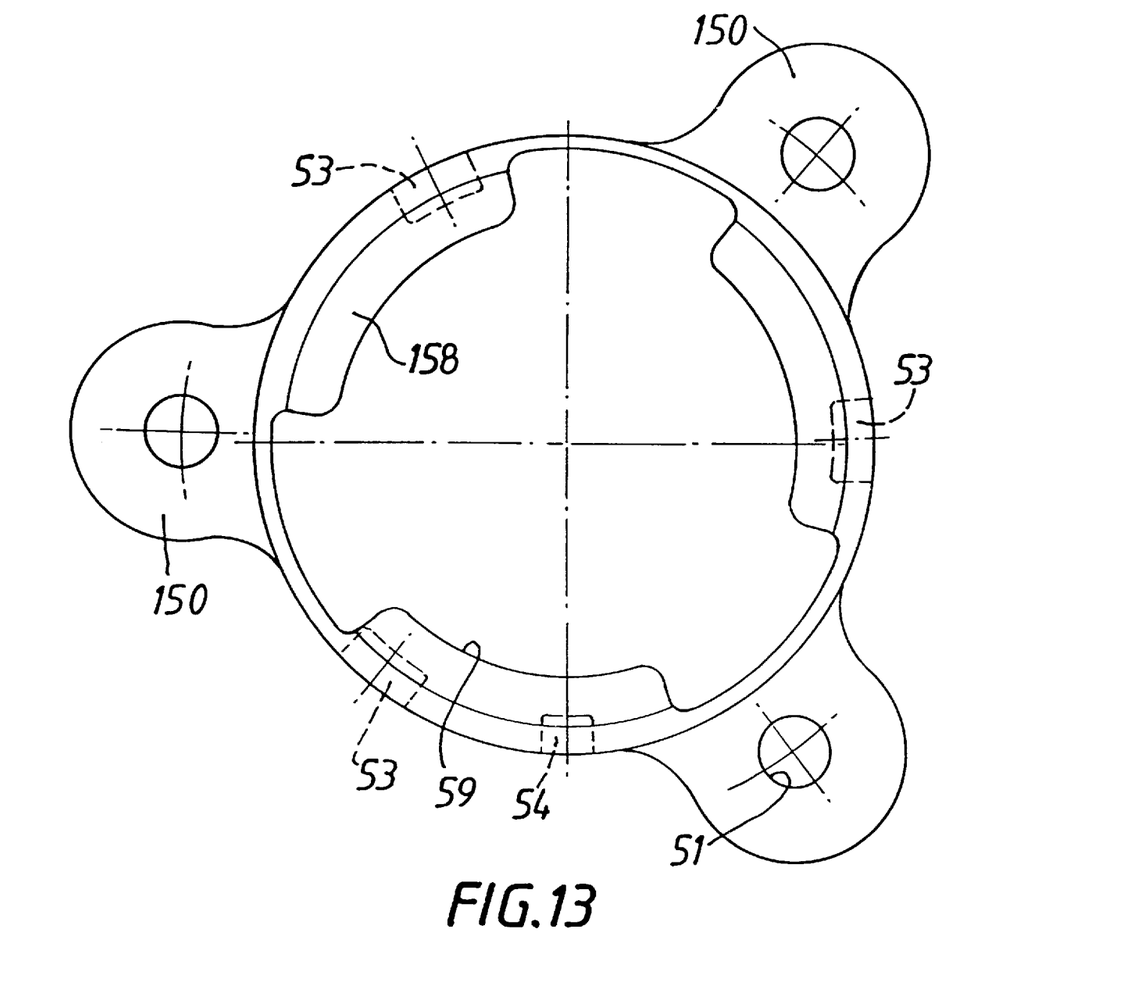
FIG. 13 is a view of the back face of the sole plate for this second example embodiment.

To do this, each sole plate has support portions 58 (FIGS. 8 and 6), 158 (FIGS. 14 and 11) for contact with the edge 42. The said portions 58,158 are transversely oriented.

Thus the rear of the bearing 1 has shims, delimited by the front face 27 of the sector 61 to 63 and the edge 42, grippingly introduced between the tabs 53 and the main part of the sole plate 5.

It will be noted that the collar 23 on the body 2 is radially stepped so that the fixing tabs 53 do not come into contact with the bellows 44.

Thus this collar 23 has radially at its outer periphery the circumferential fixing sectors 61, 62 and 63 offset radially and axially with respect to the shoulder which the said collar 23 has at its front face for supporting the enlargement on the bellows 44 (FIG. 1). The sectors 61, 62, 63 are also offset axially and radially with respect to the edge 42.

The connecting piece 20 and the connecting piece 25 are formed side by side, so that one of the circumferential fixing sectors, namely the sector 63, is shorter circumferentially than the other two.

Advantageously the bayonet-type mounting means 6 also include means of locking in rotation 68, 54.

More precisely, the outer body 2 has, at the outer periphery of its collar 23, a tab 68 provided with a hollow 69, in which a tab 54 for locking in rotation formed in the sole plate 5 is able to engage. The tab 68 is in the plane of the sectors 61 to 63.

This tab 54 on the sole plate 5 extends projecting axially from the front or forward face of the sole plate 5 so as to have a free end folded radially towards the axis of the assembly. This end is received in the hollow 69 in the lug 68, also having an entry bevel 60 so as to stress the lug 54 so that the latter consequently falls into its complementary hollow 69. The tab 54 for locking in rotation therefore forms part of the bayonet mounting means.

Figure 3:
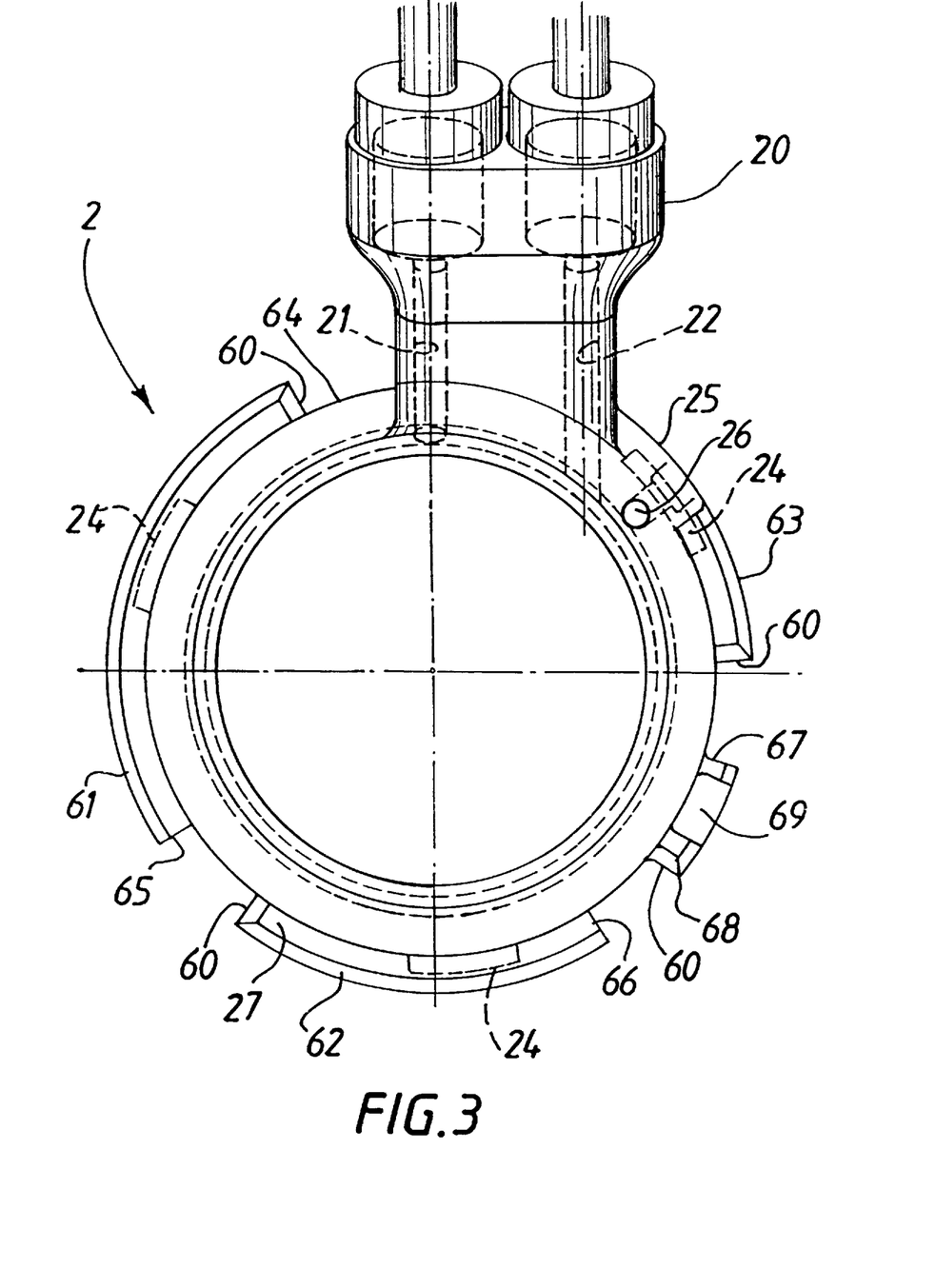
FIG. 3 is a front view of the outer body with which the clutch release bearing according to the invention is provided.
Figure 4:
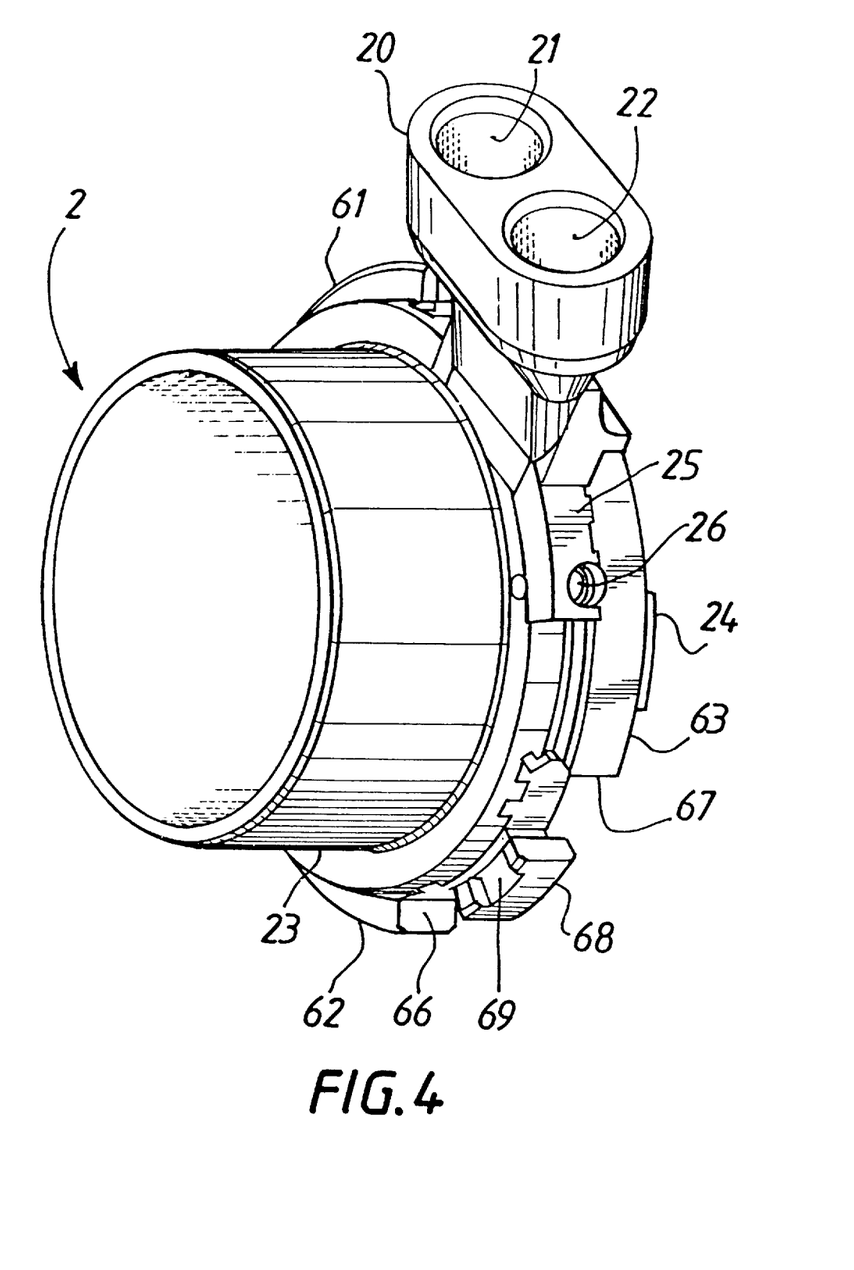
FIG. 4 is a perspective view of the said outer body.

Here four recesses 64, 65, 66, 67 are provided, as well as three circumferential fixing sectors 61, 62, 63 (FIG. 3).

Naturally all this depends on the application and on the number of fixing tabs 53 and on the number of tabs 54, referred to as tabs for locking in rotation.

Thus the tab 68 on the body 2 is separated from the sectors 62 and 63 by two recesses 66, 67 in the form of notches open towards the outside.

It will also be noted that the sectors 61 to 63 are bevelled at their outer periphery in order to facilitate the mounting of the tabs 53 which are rounded at the area of connection of their radially oriented free end with their axially oriented main part.

The peripheral bevels on the sectors 61 to 63 thus afford good mounting of the tabs 63.

In the same way the tab 68 is bevelled at its outer periphery.

It will be noted that the tab for locking in rotation 54 is less broad than the tabs 53 and that it is more flexible. This tab is not evenly distributed circumferentially with respect to the tabs 53, so that a locating device is formed, since the body 3 can be mounted in only one position so that these connecting pieces 20 and 25 occupy the correct position, as can be seen for example in FIGS. 7 and 15.

Thus it is possible to mount the bearing only in one position, and this is the reason why a single bevel 60 is provided at only one of the circumferential ends of the sectors 61 to 63 and of the tab 68.

This arrangement expresses the direction of rotation in which it is necessary to turn the body 2 and therefore the bearing 1 at the time of bayonet mounting.

As will have been understood, the locking tab 54 allows easy removal of the bearing. This is because, using a screwdriver, it suffices to lift this tab 54 so that the latter leaves the hollow 69, and then to effect a rotation of the body 2 in the reverse direction in order to effect removal.

The mounting of the bearing 1 on the sole plate 5 therefore takes place rapidly, and its removal is easy.

It will be appreciated that advantage is taken of the configuration of the grippable connecting piece 20 enabling the body 2 to be correctly gripped and to perform the necessary rotation of the body at the time of the bayonet-type mounting.

This is the reason why this connecting piece 20 is provided with drainage and feed channels 21, 22. This also makes it possible to have sectors 61 to 63 which have the desired circumferential length, the connecting piece 20 delimiting the recess 64.

It will be noted that the crimping sectors 24 are offset axially with respect to the sectors 61 to 63.

Figure 7:
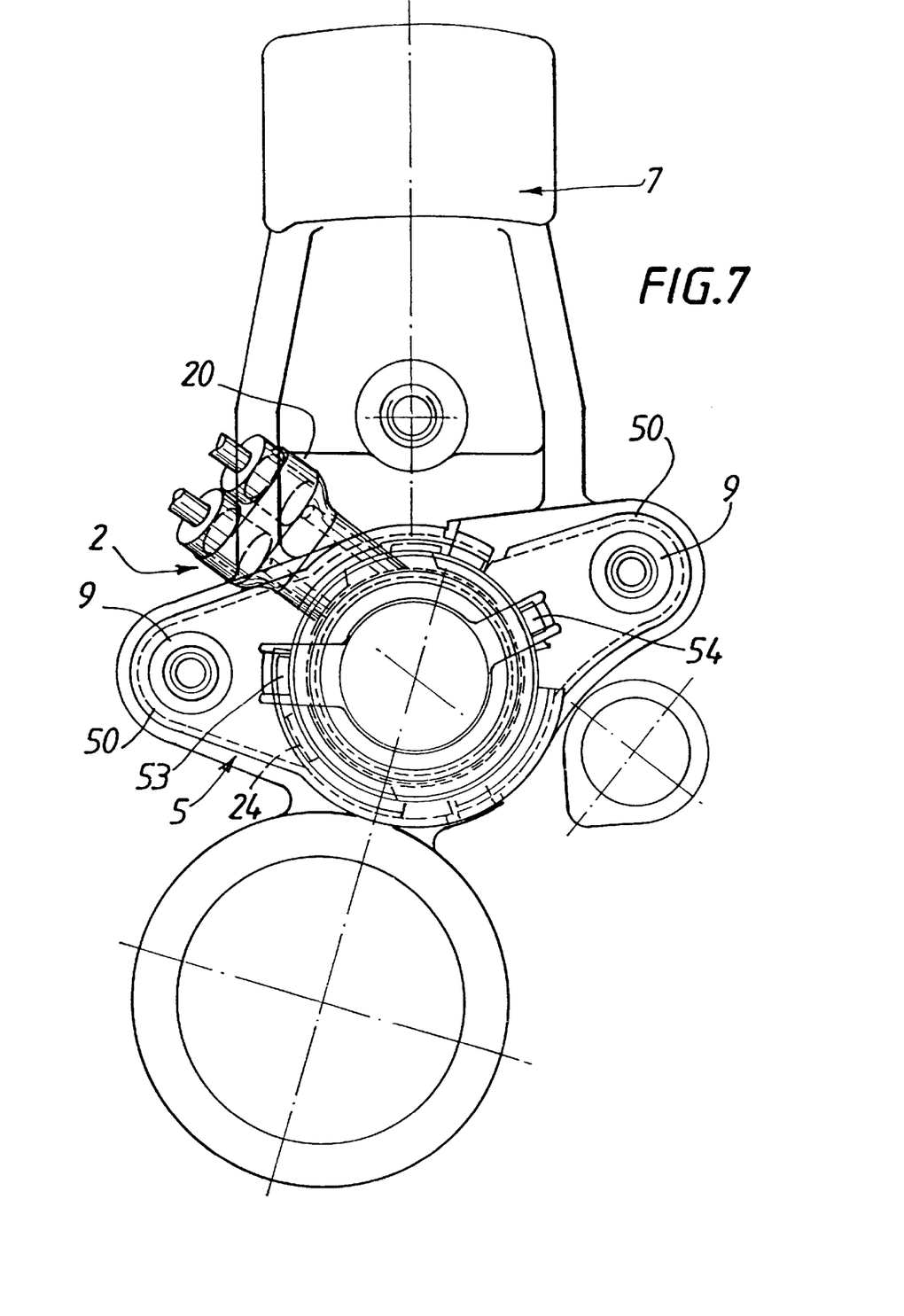
FIG. 7 is a view in the direction of the arrow 7 in FIG. 6.

More precisely, in the embodiment in FIGS. 5 to 10, the adaptation sole plate 54 has two lugs 50 for fixing it to the casing 7 by means of screws 9 (FIG. 7). This sole plate has transversely a first plane area 55 in which the holes 51 are formed and a second plane area 58 formed at the inner periphery of the sole plate 5 for contact with the edge 42 of the tube 4, this area being connected by an inclined connecting area 57 to the area 55 bearing on the casing 7.

At its outer periphery the sole plate 50 has means 56 for its centring with respect to the casing 7. These means consist here of axially oriented tabs 56.

It will be noted that a fixing tab 53 and locking tab 54 are formed by means of the central opening 59, which the sole plate has for passage of the input shaft of the gearbox 8. This opening 59 delimits the area 58, which is here divided up, the aforementioned tabs 54 and 53 being formed by means of cutouts 159 opening out into the central opening 59 (FIG. 9).

The rear face of the sole plate has a stiffening edge 52 extending axially in the opposite direction to the clutch release bearing 1, the casing 7 being divided at the edge 52 (FIG. 6).

It will be noted that the centring tabs 56 project axially from the rear face of the sole plate, that is to say in the opposite direction to the tabs 53 and 54.

Figure 8:
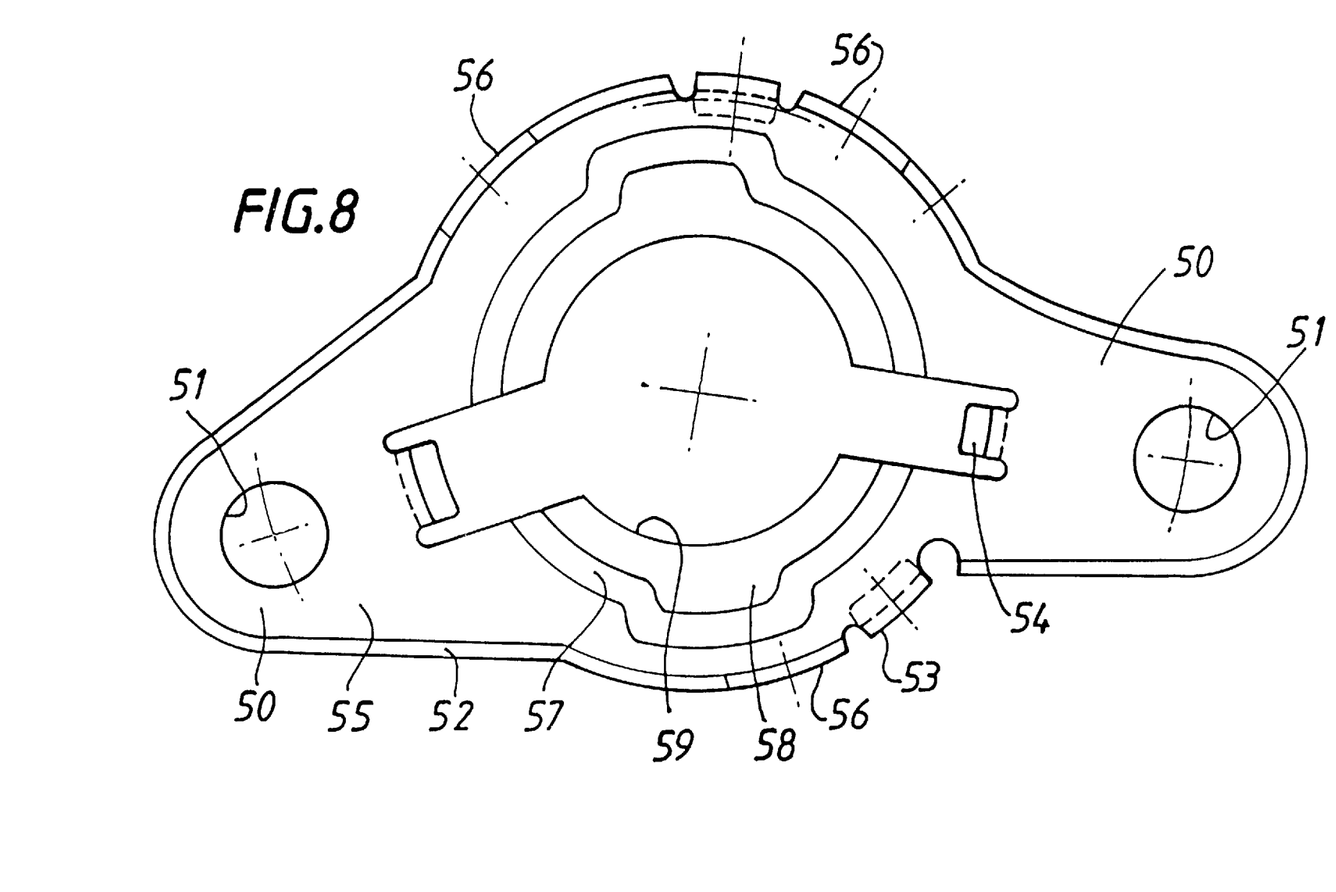
FIG. 8 is a view showing the back face of the sole plate of FIG. 5.
Figure 9:
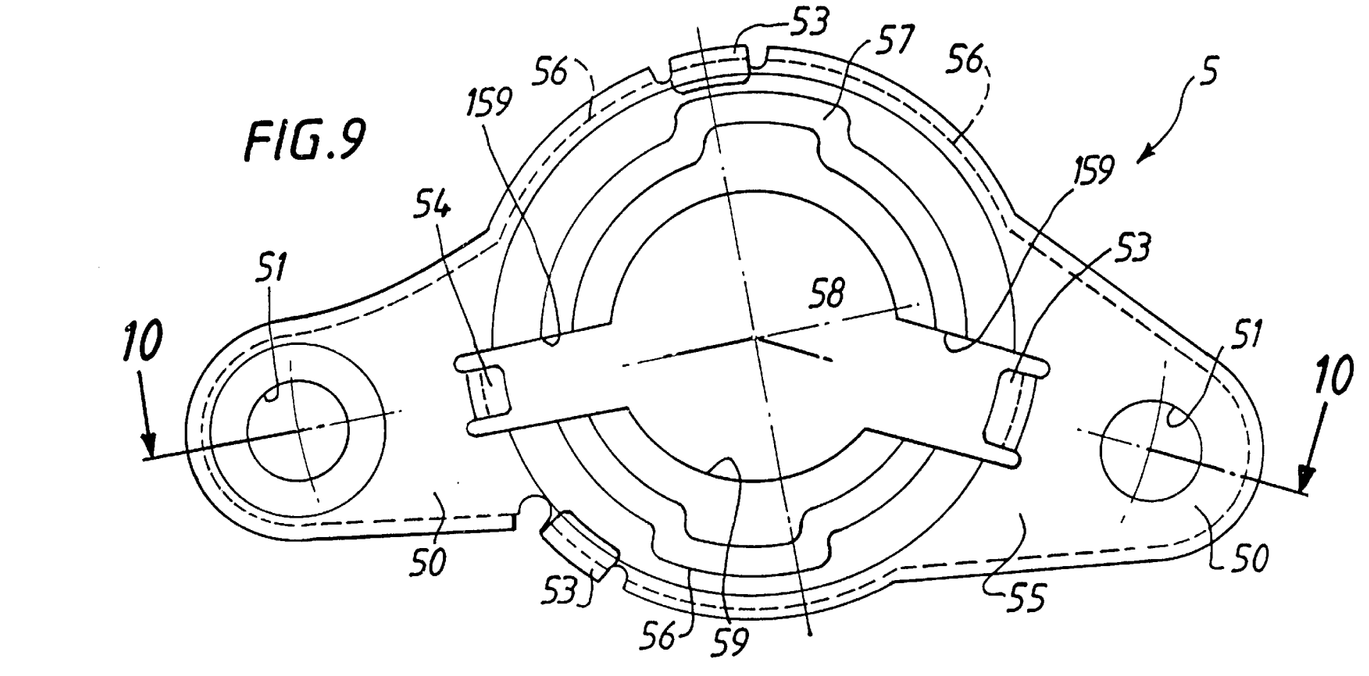
FIG. 9 is a view showing the front face of the sole plate of FIG. 5.

Thus the area 58 is offset axially with respect to the area 55, according to the embodiment in FIGS. 7 to 10, so that the bearing 1 is correctly positioned. The sole plate serves as an adaptor, having a circular shape with two lateral lugs 50 projecting laterally (FIGS. 9 and 8). It will be appreciated that the edge 52 stiffens the sole plate.

In FIGS. 11 to 15, the sole plate has three lugs 150 evenly distributed circumferentially and extending radially.

The sole plate 5 here also has a circular shape with a central support area 158 serving as a support for the edge 42 and delimited by the central opening 59 in the sole plate 5. This area is offset axially by means of an area 157 with respect to the plane area 155 in the plane of which the lugs 150, the area 155 and a support area on the casing are located. The areas 158, 155 and support area are transversely oriented.

The tabs 53 and 54 are formed at the outer periphery of the sole plate 5.

Figure 14:
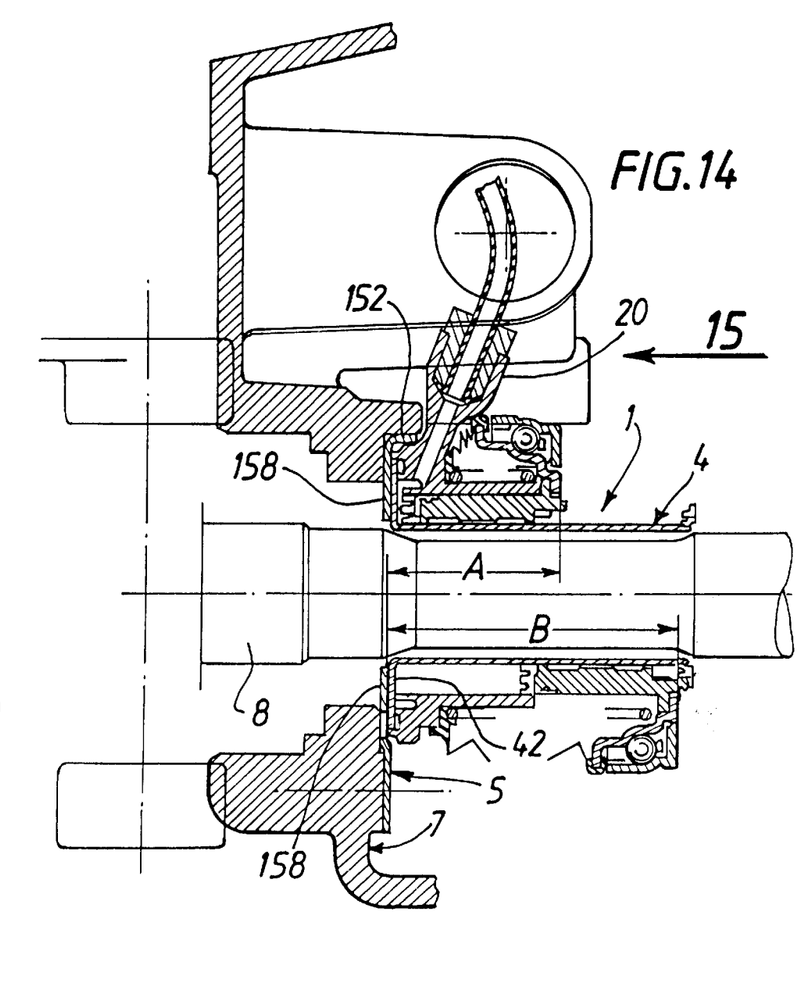
FIG. 14 is a view in axial section showing the clutch release bearing mounted on the sole plate according to this second example embodiment.

The centring means are here formed by means of portions of a stiffening edge 152, which the front face of the sole plate 5 has, the said edge 152 being directed axially in the direction of the clutch release bearing and being able to cooperate with the inner periphery of protrusions which the casing 7 has (FIG. 14).

Figure 5:
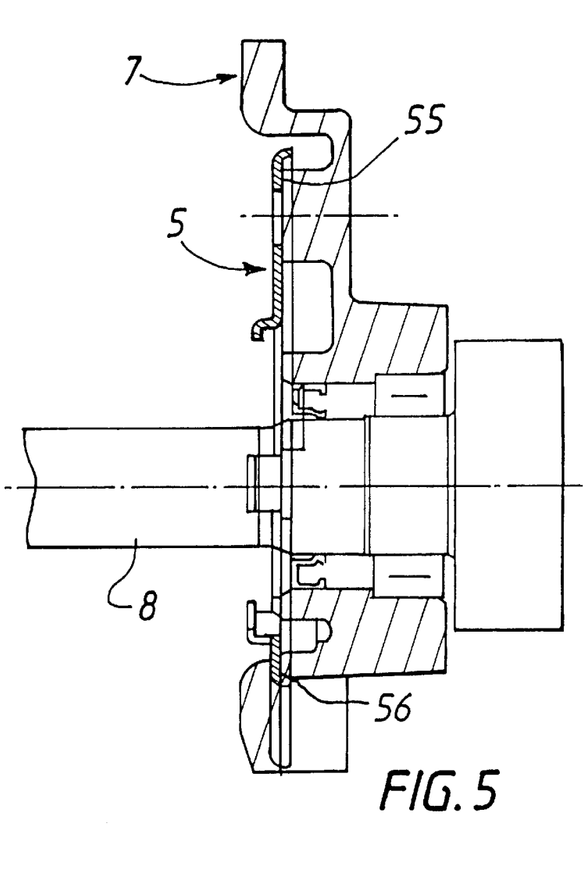
FIG. 5 is a view in axial section of the sole plate according to the invention mounted on its associated fixed part.

It will be noted that, in the first embodiment, the tabs 56 cooperate with the outer periphery of a protrusion on the casing 7 (FIG. 5).

The edge 42 is, as before, gripped between the divided area 158 and the body 2.

As will have been understood, the support areas 58, 158 are offset axially according to the application.

The sole plate 5 therefore serves as an adaptor, whilst being produced easily by pressing, and has transversely, on the one hand, at the rear an area 55, 155 bearing on the casing 7 and, on the other hand, at the front a support area 58, 158, here divided, for the rear face of the clutch release bearing 1.

The area 58, 158 is offset axially with respect to the area 55, 155.

Naturally this sole plate 5 can have more than three lugs, this depending on the application.

Likewise, whereas in FIG. 7 the lugs 50 are not diametrically opposite, the said lugs can be diametrically opposite. All this depending on the shape of the casing 7.

Naturally the present invention is not limited to the example embodiment described. In particular the bearing 38 can be fitted on the piston 3 or have one of its rings in one piece with the said piston, so that the clutch release bearing is not necessarily of the self-centring type.

Instead of being provided with rings 32, the piston 2 can slide along a guide sleeve fixed to the tube 4, for example by crimping or snapping on, as described in the document FR 95 01700, published under the number FR-A-2 730 532. This sleeve also forms a stop limiting the travel of the piston.

The fixed part of the bearing 1 can be in one part, as mentioned previously, or in three parts, the edge 42 then being attached to the tube 4 and to the body 2.

All this depends on the application.

Naturally it is possible to reverse the structures and the inner bearing ring 38 can be rotating and able to cooperate with the fingers of the diaphragm, whilst the outer ring is then fixed whilst being carried by the piston by means for example of a radial edge directed radially inwards.

Finally, the sole plate centring means can have another shape and consist for example of holes in which engage centring pins carried by the casing 7.

What is claimed is:

1. A hydraulically controlled disengagement device for a clutch provided with a disengagement device and having a unitary assembly, referred to as a clutch release bearing, provided with a fixed part comprising an outer body and a concentric inner support tube fixed to the outer body and defining an axially oriented blind annular cavity suitable for being fed with fluid and inside which is mounted so as to be axially mobile a piston projecting axially with respect to a free end of the outer body, said piston carrying, at its free end, a driving element able to act on the disengagement device of the clutch including a sole plate forming an adaptor having projecting lugs for fixing the sole plate to the fixed part by means of fixing devices, and mounting means of the bayonet type acting between said sole plate and the outer body of the clutch release bearing for bayonet-type mounting of the clutch release bearing on the sole plate previously fixed to said fixed part.

2. The device of claim 1, wherein the said sole plate has a first area for supporting the clutch release bearing and a second area for bearing on the fixed part, the first area being offset axially with respect to the second area.

3. The device of claim 1, wherein the sole plate has centring means for centring it with respect to the fixed part.

4. The device of claim 3, wherein the centring means consist of axially oriented tabs suitable for cooperating with the fixed part whilst being directed axially in the opposite direction to the clutch release bearing.

5. The device of claim 3, wherein the centring means consist of portions of an axially oriented edge which the sole plate has at its outer periphery, the edge being directed axially in the direction of the clutch release bearing.

6. The device of claim 1, wherein the sole plate is made of pressed sheet metal.

7. The device of claim 1, wherein the outer body has at its rear end a connecting piece provided with feed and drainage channels for the blind cavity, and the connecting piece is fixed to a collar so that the connecting piece makes it possible to grip the outer body correctly.

8. A hydraulically controlled disengagement device for a clutch provided with a disengagement device, said device having a unitary assembly, referred to as a clutch release bearing, comprising an outer body and a concentric inner support tube fixed to the outer body and defining an axially oriented blind annular cavity suitable for being fed with fluid and inside which is mounted so as to be axially mobile a piston projecting axially with respect to a free end of the outer body, said piston carrying, at its free end, a driving element able to act on the disengagement device of the clutch including a sole plate forming an adaptor for fixing it to a fixed part and mounting means of the bayonet type acting between said sole plate and the outer ody of the clutch release bearing for bayonet-type mounting of the clutch release bearing on the sole plate previously fixed to said unitary assembly, wherein the mounting means of the bayonet type have recesses formed at the outer periphery of a collar which the outer body has at its rear end, and in that said recesses delimit circumferential fixing sectors.

9. The device of claim 6, wherein the fixing sectors have at one of their circumferential ends a bevel forming ramp means as well as a plane face.

10. The device of claim 7, wherein the sole plate has fixing tabs able to come into gripping contact with the circumferential fixing sectors.

11. The device of claim 8, wherein the fixing tabs are in the form of an angle bracket and extend axially projecting from the front face of the sole plate whilst having a free end folded radially inwards to cooperate with the front face of the circumferential fixing sectors.

12. The device of claim 6, wherein the mounting means of the bayonet type also include means of locking in rotation.

13. The device of claim 12, wherein the locking means include a rotational-locking tab extending projecting axially from the front face of the sole plate so as to have a free end folded radially towards the axis of the assembly and the end of the tab is able to engage in the hollow formed at the outer periphery of a collar which the outer body has at its rear end.

14. The device of claim 13, wherein the hollow forms part of a tab, which the collar has at its outer periphery, the tab being separated from the circumferential fixing sectors which the outer body has for forming the mounting means of the bayonet type, by recesses.

15. The device of claim 6, wherein the inner support tube is distinct from the outer body and has at its rear end an edge directed radially in the opposite direction to the axis of the assembly, able to come into contact with the rear face of the outer body.

* * * * *